(12) United States Patent
Haramaty et al.

(10) Patent No.: US 9,699,067 B2
(45) Date of Patent: Jul. 4, 2017

(54) DRAGONFLY PLUS: COMMUNICATION OVER BIPARTITE NODE GROUPS CONNECTED BY A MESH NETWORK

(71) Applicant: Mellanox Technologies Ltd., Yokneam (IL)

(72) Inventors: Zachy Haramaty, Hemed (IL); Benny Koren, Zichron Yaakov (IL); Eitan Zahavi, Zichron Yaakov (IL); Barak Gafni, Kfar Malal (IL); Tamir Ronen, Lehavim (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 287 days.

(21) Appl. No.: 14/337,334

(22) Filed: Jul. 22, 2014

(65) Prior Publication Data

US 2016/0028613 A1    Jan. 28, 2016

(51) Int. Cl.
*H04L 12/733* (2013.01)
*H04L 12/721* (2013.01)

(52) U.S. Cl.
CPC ............ *H04L 45/122* (2013.01); *H04L 45/14* (2013.01)

(58) Field of Classification Search
CPC .............................. H04L 45/122; H04L 45/14
USPC ....................................................... 709/241
See application file for complete search history.

(56) References Cited

U.S. PATENT DOCUMENTS

| | | | |
|---|---|---|---|
| 4,312,064 A | 1/1982 | Bench et al. | |
| 5,480,500 A | 1/1996 | Richard et al. | |
| 6,115,385 A | 9/2000 | Vig | |
| 6,169,741 B1 | 1/2001 | LeMaire et al. | |
| 6,532,211 B1 | 3/2003 | Rathonyi et al. | |
| 6,553,028 B1 | 4/2003 | Tang et al. | |
| 6,665,297 B1 | 12/2003 | Hariguchi et al. | |
| 6,775,268 B1 | 8/2004 | Wang et al. | |
| 6,804,532 B1 | 10/2004 | Moon et al. | |
| 6,831,918 B1 | 12/2004 | Kavak | |
| 6,912,604 B1 | 6/2005 | Tzeng et al. | |
| 6,950,428 B1 | 9/2005 | Horst et al. | |
| 7,010,607 B1 | 3/2006 | Bunton | |
| 7,076,569 B1 | 7/2006 | Bailey et al. | |
| 7,234,001 B2 | 6/2007 | Simpson et al. | |
| 7,286,535 B2 | 10/2007 | Ishikawa et al. | |
| 7,676,597 B2 | 3/2010 | Kagan et al. | |
| 7,746,854 B2 | 6/2010 | Ambe et al. | |
| 7,936,770 B1 | 5/2011 | Frattura et al. | |
| 7,969,980 B1 | 6/2011 | Florit et al. | |

(Continued)

OTHER PUBLICATIONS

Kim et al., "Technology-Driven, Highly-Scalable Dragonfly Topology," Proceedings of the 2008 International Symposium on Computer Architecture, pp. 77-88, Jun. 21-25, 2008.

(Continued)

*Primary Examiner* — David Lazaro
*Assistant Examiner* — Zia Khurshid
(74) *Attorney, Agent, or Firm* — D. Kligler IP Services Ltd.

(57) ABSTRACT

A communication network includes multiple nodes, which are arranged in groups such that the nodes in each group are interconnected in a bipartite topology and the groups are interconnected in a mesh topology. The nodes are configured to convey traffic between source hosts and respective destination hosts by routing packets among the nodes on paths that do not traverse any intermediate hosts other than the source and destination hosts.

28 Claims, 6 Drawing Sheets

(56) References Cited

U.S. PATENT DOCUMENTS

| | | | |
|---|---|---|---|
| 8,094,569 B2 | 1/2012 | Gunukula et al. | |
| 8,175,094 B2 | 5/2012 | Bauchot et al. | |
| 8,195,989 B1 | 6/2012 | Lu et al. | |
| 8,213,315 B2 | 7/2012 | Crupnicoff et al. | |
| 8,401,012 B2 | 3/2013 | Underwood et al. | |
| 8,489,718 B1 | 7/2013 | Brar et al. | |
| 8,495,194 B1 | 7/2013 | Brar et al. | |
| 8,576,715 B2 | 11/2013 | Bloch et al. | |
| 8,605,575 B2 | 12/2013 | Gunukula et al. | |
| 8,621,111 B2 | 12/2013 | Marr et al. | |
| 8,755,389 B1 | 6/2014 | Poutievski et al. | |
| 8,774,063 B2 | 7/2014 | Beecroft | |
| 8,908,704 B2 | 12/2014 | Koren et al. | |
| 9,014,006 B2 | 4/2015 | Haramaty et al. | |
| 9,042,234 B1 | 5/2015 | Liljenstolpe et al. | |
| 2002/0013844 A1 | 1/2002 | Garrett et al. | |
| 2002/0026525 A1 | 2/2002 | Armitage | |
| 2002/0039357 A1 | 4/2002 | Lipasti et al. | |
| 2002/0136163 A1 | 9/2002 | Kawakami et al. | |
| 2002/0138645 A1 | 9/2002 | Shinomiya et al. | |
| 2002/0165897 A1 | 11/2002 | Kagan et al. | |
| 2003/0039260 A1 | 2/2003 | Fujisawa | |
| 2003/0065856 A1 | 4/2003 | Kagan et al. | |
| 2003/0079005 A1 | 4/2003 | Myers et al. | |
| 2003/0223453 A1 | 12/2003 | Stoler et al. | |
| 2004/0111651 A1 | 6/2004 | Mukherjee et al. | |
| 2004/0202473 A1 | 10/2004 | Nakamura et al. | |
| 2005/0013245 A1 | 1/2005 | Sreemanthula et al. | |
| 2005/0157641 A1 | 7/2005 | Roy | |
| 2005/0259588 A1 | 11/2005 | Preguica | |
| 2006/0126627 A1 | 6/2006 | Diouf | |
| 2006/0182034 A1 | 8/2006 | Klinker et al. | |
| 2006/0291480 A1 | 12/2006 | Cho et al. | |
| 2007/0058536 A1 | 3/2007 | Vaananen et al. | |
| 2007/0058646 A1 | 3/2007 | Hermoni | |
| 2007/0070998 A1 | 3/2007 | Sethuram et al. | |
| 2007/0091911 A1 | 4/2007 | Watanabe et al. | |
| 2007/0223470 A1 | 9/2007 | Stahl | |
| 2007/0237083 A9 | 10/2007 | Oh et al. | |
| 2008/0002690 A1 | 1/2008 | Ver Steeg et al. | |
| 2008/0112413 A1 | 5/2008 | Pong | |
| 2008/0165797 A1 | 7/2008 | Aceves | |
| 2008/0189432 A1 | 8/2008 | Abali et al. | |
| 2008/0298248 A1 | 12/2008 | Roeck et al. | |
| 2009/0103534 A1 | 4/2009 | Malledant et al. | |
| 2009/0119565 A1 | 5/2009 | Park et al. | |
| 2010/0039959 A1 | 2/2010 | Gilmartin | |
| 2010/0049942 A1* | 2/2010 | Kim | G06F 15/17375 712/29 |
| 2010/0111529 A1 | 5/2010 | Zeng et al. | |
| 2010/0141428 A1 | 6/2010 | Mildenberger et al. | |
| 2010/0216444 A1 | 8/2010 | Mariniello et al. | |
| 2010/0284404 A1 | 11/2010 | Gopinath et al. | |
| 2010/0315958 A1 | 12/2010 | Luo et al. | |
| 2011/0019673 A1 | 1/2011 | Fernandez | |
| 2011/0085440 A1 | 4/2011 | Owens et al. | |
| 2011/0085449 A1 | 4/2011 | Jeyachandran et al. | |
| 2011/0090784 A1 | 4/2011 | Gan | |
| 2011/0164496 A1 | 7/2011 | Loh et al. | |
| 2011/0225391 A1 | 9/2011 | Burroughs et al. | |
| 2011/0249679 A1 | 10/2011 | Lin et al. | |
| 2011/0255410 A1 | 10/2011 | Yamen et al. | |
| 2011/0265006 A1 | 10/2011 | Morimura et al. | |
| 2011/0299529 A1 | 12/2011 | Olsson et al. | |
| 2012/0020207 A1 | 1/2012 | Corti et al. | |
| 2012/0082057 A1 | 4/2012 | Welin et al. | |
| 2012/0144064 A1* | 6/2012 | Parker | H04L 45/04 709/241 |
| 2012/0144065 A1 | 6/2012 | Parker et al. | |
| 2012/0147752 A1 | 6/2012 | Ashwood-Smith et al. | |
| 2012/0207175 A1 | 8/2012 | Raman et al. | |
| 2012/0300669 A1 | 11/2012 | Zahavi | |
| 2012/0314706 A1 | 12/2012 | Liss | |
| 2013/0044636 A1 | 2/2013 | Koponen et al. | |
| 2013/0071116 A1 | 3/2013 | Ong | |
| 2013/0083701 A1 | 4/2013 | Tomic et al. | |
| 2013/0114599 A1 | 5/2013 | Arad | |
| 2013/0170451 A1 | 7/2013 | Krause et al. | |
| 2013/0242745 A1 | 9/2013 | Umezuki | |
| 2013/0301646 A1 | 11/2013 | Bogdanski et al. | |
| 2013/0315237 A1 | 11/2013 | Kagan et al. | |
| 2013/0322256 A1 | 12/2013 | Bader et al. | |
| 2013/0336116 A1 | 12/2013 | Vasseur et al. | |
| 2014/0043959 A1 | 2/2014 | Owens et al. | |
| 2014/0140341 A1 | 5/2014 | Bataineh et al. | |
| 2014/0192646 A1 | 7/2014 | Mir et al. | |
| 2014/0211631 A1 | 7/2014 | Haramaty et al. | |
| 2014/0313880 A1 | 10/2014 | Lu et al. | |
| 2014/0328180 A1 | 11/2014 | Kim et al. | |
| 2014/0343967 A1 | 11/2014 | Baker | |
| 2015/0030033 A1 | 1/2015 | Vasseur et al. | |
| 2015/0052252 A1 | 2/2015 | Gilde et al. | |
| 2015/0098466 A1 | 4/2015 | Haramaty et al. | |
| 2015/0124815 A1 | 5/2015 | Beliveau et al. | |
| 2015/0163144 A1 | 6/2015 | Koponen et al. | |
| 2015/0194215 A1 | 7/2015 | Douglas et al. | |
| 2015/0195204 A1 | 7/2015 | Haramaty et al. | |
| 2015/0372898 A1 | 12/2015 | Haramaty et al. | |
| 2015/0372916 A1 | 12/2015 | Haramaty et al. | |
| 2016/0014636 A1 | 1/2016 | Bahr et al. | |
| 2016/0182378 A1 | 6/2016 | Basavaraja et al. | |
| 2016/0294715 A1 | 10/2016 | Raindel et al. | |

OTHER PUBLICATIONS

Jiang et al., "Indirect Adaptive Routing on Large Scale Interconnection Networks," Proceedings of the 2009 International Symposium on Computer Architecture, pp. 220-331, Jun. 20-24, 2009.

Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.

Matsuoka, S., "You Don't Really Need Big Fat Switches Anymore—Almost," Information Processing Society of Japan (IPSJ) Journal, 6 pages, year 2008.

Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.

"InfiniBandTM Architecture Specification," vol. 1, Release 1.2.1, sections 7.6, 7.9 and 14, Nov. 2007.

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

U.S. Appl. No. 14/662,259 Office Action dated Sep. 22, 2016.

Dally et al., "Deadlock-Free Message Routing in Multiprocessor Interconnection Networks", IEEE Transactions on Computers, vol. C-36, No. 5, May 1987, pp. 547-553.

U.S. Appl. No. 14/745,488 Office Action dated Dec. 6, 2016.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Afek et al., "Sampling and Large Flow Detection in SDN", SIGCOMM '15, pp. 345-346, Aug. 17-21, 2015, London, UK.

(56) References Cited

OTHER PUBLICATIONS

Culley et al., "Marker PDU Aligned Framing for TCP Specification", IETF Network Working Group, RFC 5044, Oct. 2007.
Shah et al., "Direct Data Placement over Reliable Transports", IETF Network Working Group, RFC 5041, Oct. 2007.
Martinez et al., "Supporting fully adaptive routing in Infiniband networks", Proceedings of the International Parallel and Distributed Processing Symposium (IPDPS'03),Apr. 22-26, 2003.
Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.
Gusat et al., "R3C2: Reactive Route & Rate Control for CEE", Proceedings of 18th IEEE Symposium on High Performance Interconnects, New York, USA, pp. 50-57, Aug. 10-27, 2010.
Wu et al., "DARD: Distributed adaptive routing datacenter networks", Proceedings of IEEE 32nd International Conference Distributed Computing Systems, pp. 32-41, Jun. 18-21, 2012.
Ding et al., "Level-wise scheduling algorithm for fat tree interconnection networks", Proceedings of the 2006 ACM/IEEE Conference on Supercomputing (SC 2006), 9 pages, Nov. 2006.
U.S. Appl. No. 14/046,976 Office Action dated Jun. 2, 2015.
Li et al., "Multicast Replication Using Dual Lookups in Large Packet-Based Switches", 2006 IET International conference on Wireless, Mobile and Multimedia Networks, pp. 1-3, Nov. 6-9, 2006.
Nichols et al., "Definition of the Differentiated Services Field (DS Field) in the IPv4 and IPv6 Headers", Network Norking Group, RFC 2474, 20 pages, Dec. 1998.
Microsoft., "How IPv4 Multicasting Works", 22 pages, Mar. 28, 2003.
Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.
IEEE 802.1Q, "IEEE Standard for Local and metropolitan area networks Virtual Bridged Local Area Networks", IEEE Computer Society, 303 pages, May 19, 2006.
Plummer, D., "An Ethernet Address Resolution Protocol," Network Working Group ,Request for Comments (RFC) 826, 10 pages, Nov. 1982.
Hinden et al., "IP Version 6 Addressing Architecture," Network Working Group ,Request for Comments (RFC) 2373, 26 pages, Jul. 1998.
U.S. Appl. No. 12/910,900 Office Action dated Apr. 9, 2013.
U.S. Appl. No. 14/046,976 Office Action dated Jan. 14, 2016.
Nkposong et al., "Experiences with BGP in Large Scale Data Centers:Teaching an old protocol new tricks", 44 pages, Jan. 31, 3014.
"Equal-cost multi-path routing", Wikipedia, 2 pages, Oct. 13, 2014.
Thaler et al., "Multipath Issues in Unicast and Multicast Next-Flop Selection", Network Working Group, RFC 2991, 9 pages, Nov. 2000.
Glass et al., "The turn model for adaptive routing", Journal of the ACM, vol. 41, No. 5, pp. 874-903, Sep. 1994.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over IntiniBand: An MPI Perspective", Seventh IEEE International Symposium on Cluster Computing and the Grid (CCGrid'07), 8 pages, year 2007.
NOWLAB—Network Based Computing Lab, 2 pages, years 2002-2015 http://nowlab.cse_ohio-state.edu/publications/conf-presentations/2007/vishnu-ccgrid07.pdf.
Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modem High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
U.S. Appl. No. 14/732,853 Office Action dated Jan. 26, 2017.

\* cited by examiner

DRAGONFLY PLUS: COMMUNICATION OVER BIPARTITE NODE GROUPS CONNECTED BY A MESH NETWORK

FIELD OF THE INVENTION

The present invention relates generally to communication networks, and particularly to high-performance network topologies.

BACKGROUND OF THE INVENTION

Computer networks, such as data centers or High-Performance Computing (HPC) compute-node clusters, typically use network elements such as switches and routers that are interconnected using various interconnection topologies. Some known topologies include, for example, mesh, Fat-Tree (FT) and Dragonfly (DF).

The Dragonfly topology is described, for example, by Kim et al., in "Technology-Driven, Highly-Scalable Dragonfly Topology," Proceedings of the 2008 International Symposium on Computer Architecture, Jun. 21-25, 2008, pages 77-88, which is incorporated herein by reference. U.S. Patent Application Publication 2010/0049942 to Kim et al., whose disclosure is incorporated herein by reference, describes a Dragonfly processor interconnect network that comprises a plurality of processor nodes, a plurality of routers, each router directly coupled to a plurality of terminal nodes, the routers coupled to one another and arranged into a group, and a plurality of groups of routers, such that each group is connected to each other group via at least one direct connection.

Jiang et al. describe indirect global adaptive routing (IAR) schemes in Dragonfly networks, in which the adaptive routing decision uses information that is not directly available at the source router, in "Indirect Adaptive Routing on Large Scale Interconnection Networks," Proceedings of the 2009 International Symposium on Computer Architecture, Jun. 20-24, 2009, pages 220-231, which is incorporated herein by reference.

Garcia et al. describe a routing/flow-control scheme for Dragonfly networks, which decouples the routing and the deadlock avoidance mechanisms, in "On-the-Fly Adaptive Routing in High-Radix Hierarchical Networks," Proceedings of the 2012 International Conference on Parallel Processing (ICPP), Sep. 10-13, 2012, which is incorporated herein by reference.

Prisacari et al. investigate indirect routing over Dragonfly networks, in in "Performance implications of remote-only load balancing under adversarial traffic in Dragonflies," Proceedings of the 8th International Workshop on Interconnection Network Architecture: On-Chip, Multi-Chip, Jan. 22, 2014, which is incorporated herein by reference.

Matsuoka describes techniques for implementing high-bandwidth collective communications, in "You Don't Really Need Big Fat Switches Anymore—Almost," Information Processing Society of Japan (IPSJ) Journal, 2008, which is incorporated herein by reference.

SUMMARY OF THE INVENTION

An embodiment of the present invention that is described herein provides a communication network including multiple nodes, which are arranged in groups such that the nodes in each group are interconnected in a bipartite topology and the groups are interconnected in a mesh topology. The nodes are configured to convey traffic between source hosts and respective destination hosts by routing packets among the nodes on paths that do not traverse any intermediate hosts other than the source and destination hosts.

In some embodiments, the nodes are configured to prevent cyclic flow-control deadlocks by modifying a virtual lane value of a packet, which originates in a source group and destined to a destination group, when the packet traverses an intermediate group. In an embodiment, the nodes are configured to prevent the cyclic flow-control deadlocks using no more than two different virtual lane values for any packet.

In a disclosed embodiment, a given node is configured to modify the virtual lane value of the packet in response to detecting that the packet enters the given node in an inbound direction from the source group and is to exit the given node in an outbound direction en-route to the destination group. In an embodiment, a given node is configured to define a set of permitted onward routes for the packet depending on the virtual lane value of the packet, and to choose an onward route for the packet from among the permitted onward routes.

In some embodiments, a given node is configured to permit routing of the packet via intermediate groups if the virtual lane value of the packet has not been modified, and to prohibit routing of the packet via intermediate groups if the virtual lane value of the packet has been modified. In an embodiment, a given node is configured to permit onward routing of a received packet, which originates in a source group and destined to a destination group, via an intermediate group only upon verifying that the received packet did not previously traverse any intermediate group.

In some embodiments, a given node is configured to define a set of permitted onward routes for a packet depending on a virtual lane value of the packet and on a port of the given node via which the packet was received. In an embodiment, the given node is configured to store two or more forwarding tables, and to define the set of permitted onward routes by choosing one of the forwarding tables depending on the virtual lane value and the port. In a disclosed embodiment, the given node is configured to represent at least two of the forwarding tables using a single table, and to access the single table based on the virtual lane value. In another embodiment, the nodes are configured to select routes for the packets, while giving first priority to direct routes from a source group to a destination group, and second priority to indirect routes that traverse an intermediate group en-route from the source group to the destination group.

In some embodiments, a node that lies on a routing path is configured to identify a compromised ability to forward the packets onwards along the routing path, and to send to one or more preceding nodes along the routing path a notification that requests the preceding nodes to find an alternative routing path for the packets. In an embodiment, the node is configured to specify in the notification a value that specifies which type of node is to consume the notification. In an embodiment, the routing path includes first and second preceding nodes of a same type, and a preceding node along the routing path is configured to replace the value with a different value, so as to cause one of the first and second preceding nodes to pass the notification and the other of the first and second preceding nodes to consume the notification.

There is additionally provided, in accordance with an embodiment of the present invention, a method for communication, including, in a network that includes multiple nodes, which are arranged in groups such that the nodes in each group are interconnected in a bipartite topology and the groups are interconnected in a mesh topology, defining between source hosts and respective destination hosts paths that do not traverse any intermediate hosts other than the source and destination hosts. Traffic is conveyed between the source hosts and the respective destination hosts by routing packets among the nodes on the paths.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved communication network configurations and associated methods. In some embodiments, a communication network, e.g., an Infiniband™ network, comprises multiple nodes such as switches or routers. Some of the nodes are connected to user endpoints, referred to as hosts, and the network serves the hosts by routing packets among the nodes.

The nodes are arranged in multiple groups, such that the nodes in each group are interconnected in a bipartite topology, and the groups are interconnected in a mesh topology. The term "bipartite topology" means that the nodes of a given group are divided into two subsets, such that all intra-group links connect a node of one subset with a node of the other subset. One non-limiting example of a bipartite topology is the Fat-Tree (FT) topology. The term "mesh topology" means that every group is connected to every other group using at least one direct inter-group link.

In some disclosed embodiments, the nodes prevent cyclic flow-control deadlocks (also referred to as credit loops) from occurring, by modifying the Virtual Lane (VL) values of the packets as they traverse the network. In an embodiment, when a packet is routed from a source group to a destination group via an intermediate group, one of the nodes in the intermediate group modifies the packet VL. Since the nodes typically apply flow control independently per VL, this technique prevents credit loops from occurring. In an example embodiment, the VL modification is performed by the "reflecting node"—The node that changes the packet direction from inbound (from the mesh network into the intermediate group) to outbound (from the intermediate group back to the mesh network). In these embodiments, it is possible to prevent credit loops by using no more than two VL values.

In some embodiments, the nodes carry out a progressive Adaptive Routing (AR) process that is based on the above-described VL modification mechanism. The disclosed AR process aims to allow each node maximal flexibility in making routing decisions, while meeting the constraint that a packet should not traverse more than one intermediate group.

In an embodiment, when a node receives a packet, the node checks whether the packet has already traversed an intermediate group or not by checking the packet VL. If the packet VL has not been modified, the node concludes that the packet did not traverse any intermediate group yet. In such a case, the node is free to route the packet either directly to the destination group or via an intermediate group. If the packet VL has been modified, the node concludes that the packet has already traversed an intermediate group before, and therefore has to choose a direct route to the destination group. In this way, the VL modification mechanism, which is used for preventing credit loops, is also used for progressive AR. This technique is also applicable in other routing schemes in which a given node is permitted to choose a route from among a set of possible routes.

Other disclosed embodiments perform AR using inter-node AR Notification (ARN) signaling. In these embodiments, when a node detects an event that compromises its ability to forward the packets over the next link, the detecting node sends an ARN packet backwards along the path. The ARN typically requests preceding nodes along the route to modify the route so as not to traverse the detecting node.

The networks and associated methods described herein reduce the node cost, size and power consumption. For example, since the disclosed techniques prevent credit loops using no more than two VL values, they enable considerable reduction in the number of memory buffers needed in the nodes. The disclosed techniques are also highly scalable, and enable an increase in bandwidth utilization. Moreover, the disclosed techniques may be implemented using existing building blocks designed for Fat-Tree (FT) networks.

System Description

Figure 1:
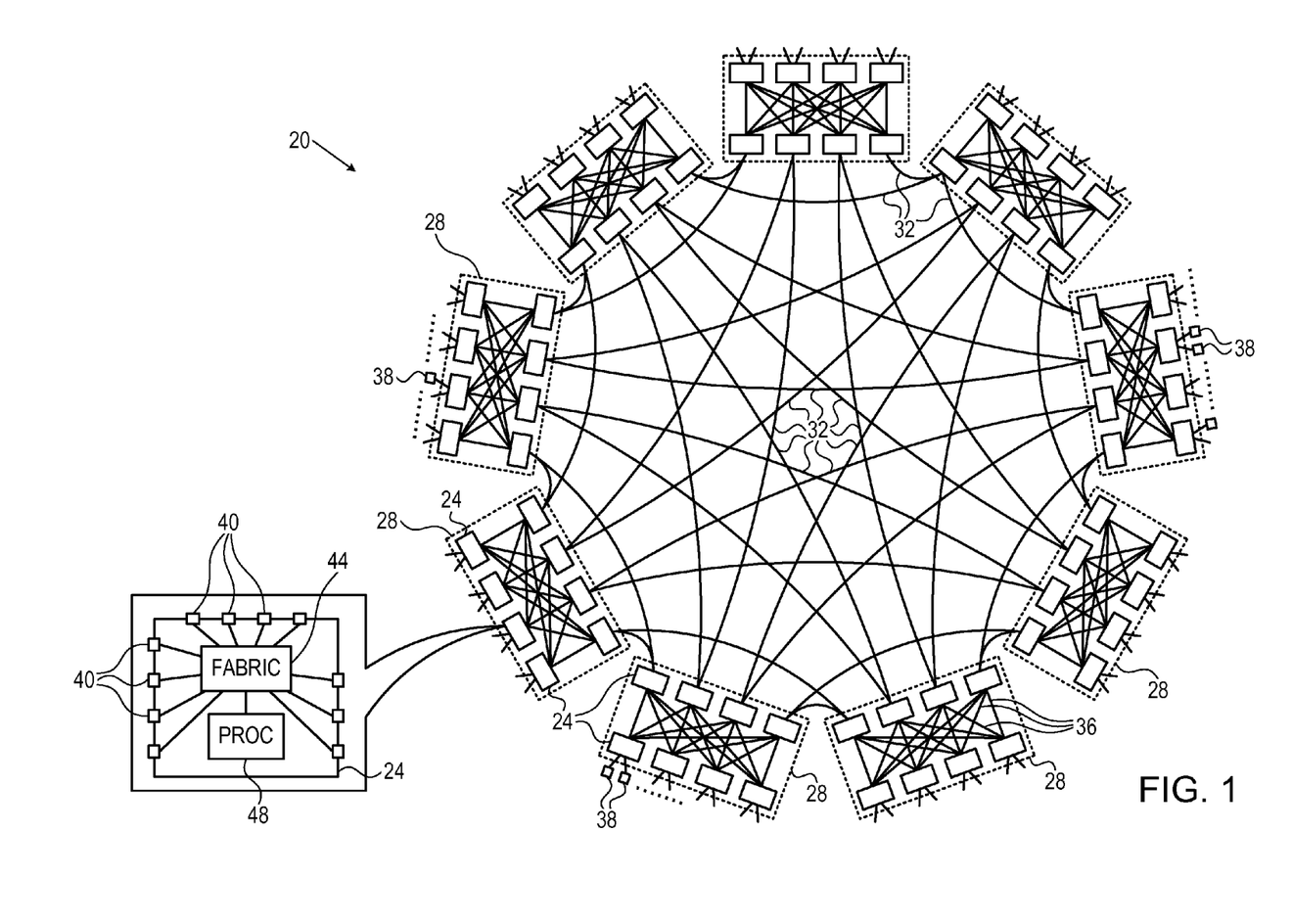
FIG. 1 is a block diagram that schematically illustrates a high-performance computer network, in accordance with an embodiment of the present invention.

FIG. 1 is a block diagram that schematically illustrates a high-performance computer network 20, in accordance with an embodiment of the present invention. Network 20 may comprise, for example, a data center, a High-Performance Computing (HPC) system or any other suitable type of network.

Network 20 comprises multiple network nodes 24, also referred to herein simply as nodes for brevity. Nodes 24 typically comprise packet switches or routers. Nodes 24 are arranged in multiple groups 28. Groups 28 are connected to one another using network links 32, e.g., optical fibers, each connected between a port of a node in one group and a port in a node of another group. Links 32 are referred to herein as inter-group links or global links.

The set of links 32 is referred to herein collectively as an inter-group network or global network. In the disclosed embodiments, the inter-group network has a mesh topology, i.e., every group 28 is connected to every other group 28 using at least one direct inter-group link 32. Put in another way, any pair of groups 28 comprise at least one respective pair of nodes 24 (one node in each group) that are connected to one another using a direct inter-group link 32.

The nodes within each group 28 are interconnected by network links 36, e.g., optical fibers. Each link 36 is connected between respective ports of two nodes within a given group 28. Links 36 are referred to herein as intra-group links or local links, and the set of links 36 in a given group 28 is referred to herein collectively as an intra-group network or local network. Within each group 28, nodes 24 are connected in a bipartite graph topology. In such a topology, the nodes are divided into two subsets, such that all links 36 connect a node of one subset and a node of the other subset. In other words, no direct links connect between nodes of the same subset.

In an example embodiment, the nodes in each group are connected in a Fat Tree (FT) topology. Alternatively, however, the intra-group network may be implemented using any other suitable bipartite topology. The bipartite topology may be full (i.e., every node in one subset is directly connected to every node in the other subset) or partial. The two subsets may be of the same size or of different sizes. In a partial bipartite topology, not every node of one subset is connected to every node of the other subset. A bipartite topology may be partial by design, e.g., in order to save cost, or as a result of link failure. In some bipartite topologies, a certain pair of nodes may be connected by two or more local links in parallel. In the context of the present patent application and in the claims, all such variations are regarded as bipartite topologies.

Within a given group 28, one subset of nodes 24 (referred to as spine nodes) connect the group to the mesh network using links 32. The other subset of nodes 24 (referred to as leaf nodes) are connected to hosts 38, also referred to as endpoints or clients. Hosts 38 may comprise any suitable type of computing devices, such as servers. In the example of FIG. 1, each group 28 comprises four spine nodes and four leaf nodes.

An inset at the bottom-left of the figure shows a simplified view of the internal configuration of node 24, in an example embodiment. The other nodes typically have a similar structure. In this example, node 24 comprises multiple ports 40 for connecting to links 32 and/or 36 and/or endpoints 38, a switch fabric 44 that is configured to forward packets between ports 40, and a processor 48 that carries out the methods described herein.

In the embodiments described herein, network 20 operates in accordance with the InfiniBand™ standard. Infiniband communication is specified, for example, in "InfiniBand™ Architecture Specification," Volume 1, Release 1.2.1, November, 2007, which is incorporated herein by reference. In particular, section 7.6 of this specification addresses Virtual Lanes (VL) mechanisms, section 7.9 addresses flow control, and chapter 14 addresses subnet management (SM) issues. In alternative embodiments, however, network 20 may operate in accordance with any other suitable communication protocol or standard, such as IPv4, IPv6 (which both support ECMP) and "controlled Ethernet."

In some embodiments, network 20 is associated with a certain Infiniband subnet, and is managed by a processor referred to as a subnet manager (SM). The SM tasks may be carried out, for example, by software running on one or more of processors 48 of nodes 24, and/or on a separate processor. Typically, the SM configures switch fabrics 44 and/or processors 48 in the various nodes 24 to carry out the methods described herein.

The configurations of network 20 and node 24 shown in FIG. 1 are example configurations that are depicted purely for the sake of conceptual clarity. In alternative embodiments, any other suitable network and/or node configuration can be used. For example, groups 28 need not necessarily comprise the same number of nodes, and each group 28 may comprise any suitable number of nodes. The nodes in a given group 28 may be arranged in any suitable bipartite graph topology, whether full or partial.

The different elements of nodes 24 may be implemented using any suitable hardware, such as in an Application-Specific Integrated Circuit (ASIC) or Field-Programmable Gate Array (FPGA). In some embodiments, some elements of nodes 24 can be implemented using software, or using a combination of hardware and software elements. In some embodiments, processors 48 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Traffic Routing Over Bipartite Node Groups Connected by Mesh Network

As can be seen in FIG. 1, traffic between a pair of endpoints 38 can be routed over various paths in network 20, i.e., various combinations of local links 36 and global links 32. The topology of network 20 thus provides a high degree of fault tolerance, and enables effective load balancing.

Figure 2:
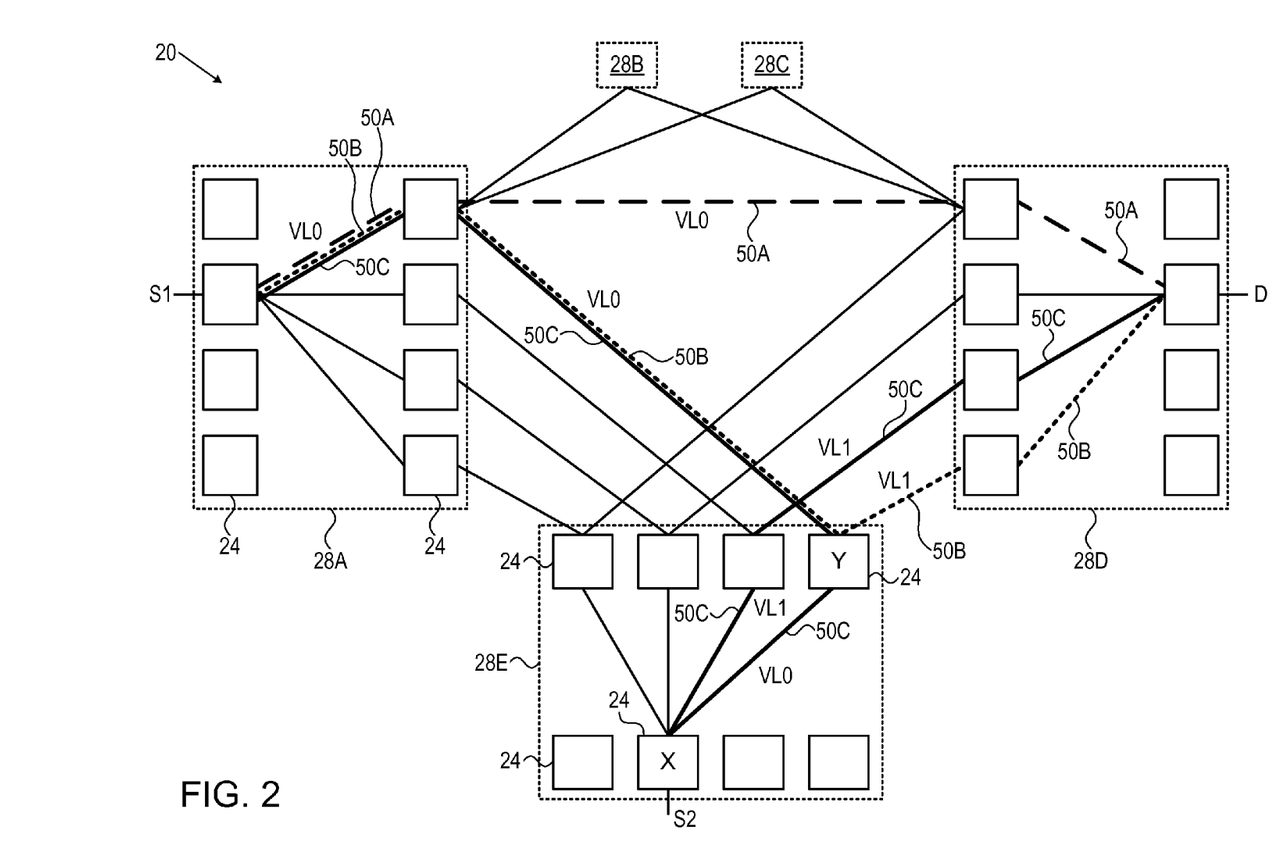
FIG. 2 is a diagram showing alternative routing paths in the network of FIG. 1, in accordance with an embodiment of the present invention.

FIG. 2 is a diagram that schematically illustrates example routing paths in network 20, in accordance with an embodiment of the present invention. Only five node groups 28A . . . 28E, and only a subset of the nodes and local and global links are shown, for the sake of clarity. The present example shows three possible routing paths 50A . . . 50C, which connect a source endpoint S1 in group 28A to a destination endpoint D in group 28D. Paths 50A . . . 50C are chosen by way of example—Many other paths exist between endpoints S1 and D.

Path 50A is the shortest path, traversing a local link, then a global link, and finally another local link. Such a path is most likely to have the smallest latency, especially since it the traffic is routed directly from group 28A to group 28D without traversing any intermediate group. This type of path is referred to herein as "Type-A." For a given source and destination, there may exist zero, one, or multiple Type-A paths.

Path 50B traverses a local link, then two global links (via group 28E—serving in this case as an intermediate group), and finally another local link. In this path, in intermediate group 28E the traffic traverses only one of the spine nodes (denoted Y) without reaching the leaf nodes. The traffic is "reflected" by this spine node, and therefore spine node Y in this scenario is referred to as a "reflecting node." This type of path is referred to herein as "Type-B." For a given source and destination, there may exist zero, one, or multiple Type-B paths.

Path 50C traverses a local link, then a global link to intermediate group 28E, then two local links inside group 28E, and finally another local link. In this path, in intermediate group 28E the traffic traverses two spine nodes and one leaf node (denoted X). In intermediate group 28E, the traffic is "reflected" by this leaf node, i.e., leaf node X serves as a reflecting node in path 50C. This type of path is referred to herein as "Type-C." For a given source and destination, there typically exist multiple Type-C paths.

It should be noted that in the disclosed embodiments, the routing paths do not traverse any endpoint 38 other than the source and destination. Path 50C, for example, traverses a leaf node denoted X in group 28E that is connected to an endpoint denoted S2. Nevertheless, the traffic does not exit node X toward S2, only routed by node X from one spine node to another in the group.

Note also that the choice of routing paths is typically constrained to traverse no more than a single intermediate group. This constraint maintains small latency, while still enabling a high degree of resilience and flexibility for load balancing.

Prevention of Credit Loops

In Infiniband, and in some other network protocols, network nodes employ credit-based flow control to regulate the traffic over the network links and avoid overflow in the node buffers. In some practical scenarios, a cyclic flow-control deadlock may occur when all the ports along some closed-loop path wait for credits, and thus halt the traffic. This sort of cyclic flow-control deadlock scenario is sometimes referred to as a credit loop.

In some embodiments, nodes 24 prevent credit loops by modifying the Virtual Lanes (VLs) of the packets as they route the packets via network 20. Since the nodes typically buffer traffic and apply flow control independently per VL, modifying the VL of the packets at some point along a cyclic path will prevent credit loops from occurring on this path.

As demonstrated above, when packets are routed via an intermediate group, one of the nodes in the intermediate group serves as a reflecting node. The reflecting node receives the packets in the inbound direction (from the global network into the local network), and forwards the packets in the outbound direction (from the local network back into the global network). The reflecting node may comprise a spine node (e.g., node Y in path 50B) or a leaf node (e.g., node X in path 50C).

In some embodiments, a given node modifies the VL of the packets for which it serves as a reflecting node. For other packets, which pass through the node but are not reflected, the node retains the existing VL.

Consider, for example, path 50B in FIG. 2. In this path the packets are initially assigned VL=0. Node Y in group 28E changes the packet VL to VL=1. The other nodes along path 50B do not change the VL. As another example, in path 50C the packet VL is modified from VL=0 to VL=1 by node X, which serves as a reflecting node. As a result of the VL modification, credit loops are prevented.

Figure 3:
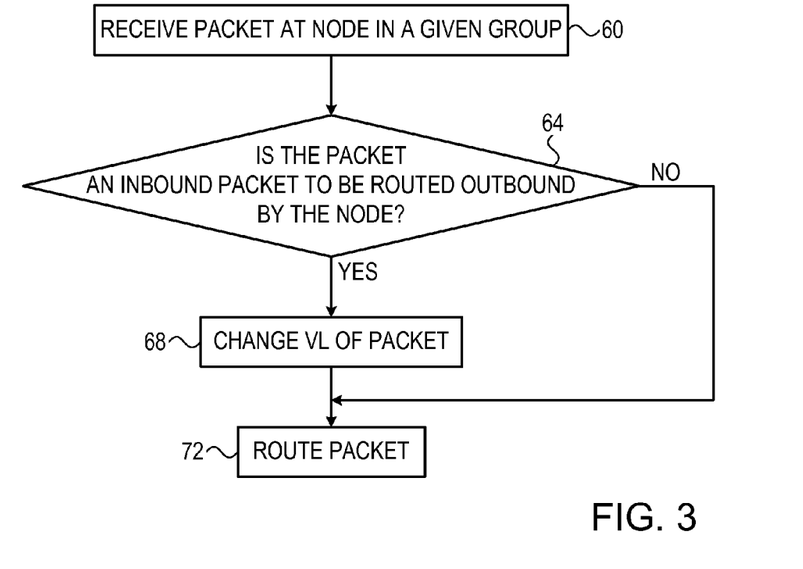
FIG. 3 is a flow chart that schematically illustrates a method for preventing credit loops, in accordance with an embodiment of the present invention.

FIG. 3 is a flow chart that schematically illustrates a method for preventing credit loops, in accordance with an embodiment of the present invention. The method begins with a certain node receiving a packet, at a packet reception step 60.

The node checks whether it serves as a reflecting node for this packet, at a reflection checking step 64. Typically, the node checks whether the packet has arrived in the inbound direction (from the direction of the global network) and is to be forwarded in the outbound direction (back toward the global network). In a spine node, the node typically checks whether the packet arrived over a global link and is to be forwarded over a global link. In a leaf node, the node typically checks whether the packet arrived from a spine node and is to be forwarded to a spine node.

If the node concludes that it serves as a reflecting node, the node modifies the packet VL, at a VL modification step 68. The node then routes the packet, at a routing step 72. If, at step 64, the node concludes that it does not serve as a reflecting node, the node does not change the packet VL, and the method proceeds directly to routing step 72.

Using this technique, nodes 24 are able to eliminate credits loops while using no more than two VL values. In the present example the nodes use VL=0 and VL=1, but any other suitable VL values can be used. In an example embodiment, throughout network 20 packets are initially assigned VL=0, 2, 4 or 6. Reflecting nodes increment the VL by one, i.e., change VL=0 to VL=1, VL=2 to VL=3, VL=4 to VL=5, and VL=6 to VL=7.

Alternatively, any other suitable VL modification can be used. For example, routing schemes that allow up to two intermediate groups can be implemented using three VL values, and routing schemes that allow up to three intermediate groups can be implemented using four VL values. Alternatively, it is possible to allow two intermediate groups, e.g., in case of link failure, using only two VL values, with some risk of credit loops.

Progressive Adaptive Routing

In some embodiments, nodes 24 carry out a progressive Adaptive Routing (AR) process that is based on the VL modification mechanism described above. The rationale behind the disclosed process is the following:

A packet should not traverse more than one intermediate group.

Adaptive routing for a given packet can be permitted or prohibited progressively, as the packet traverses the network: If the packet did not pass through an intermediate group yet, subsequent nodes are free to choose among paths that go through an intermediate group. If the packet has already passed an intermediate group once, subsequent nodes may choose only paths that lead directly to the destination group without passing through any intermediate group.

The above-described VL modification mechanism can be used as an indication of whether a packet has already passed through an intermediate group or not: A packet whose VL is still the originally-assigned VL (e.g., VL=0 in FIG. 2) did not go through an intermediate group. A packet whose VL has been modified (e.g., VL=1 in FIG. 2) already traversed an intermediate group.

Figure 4:
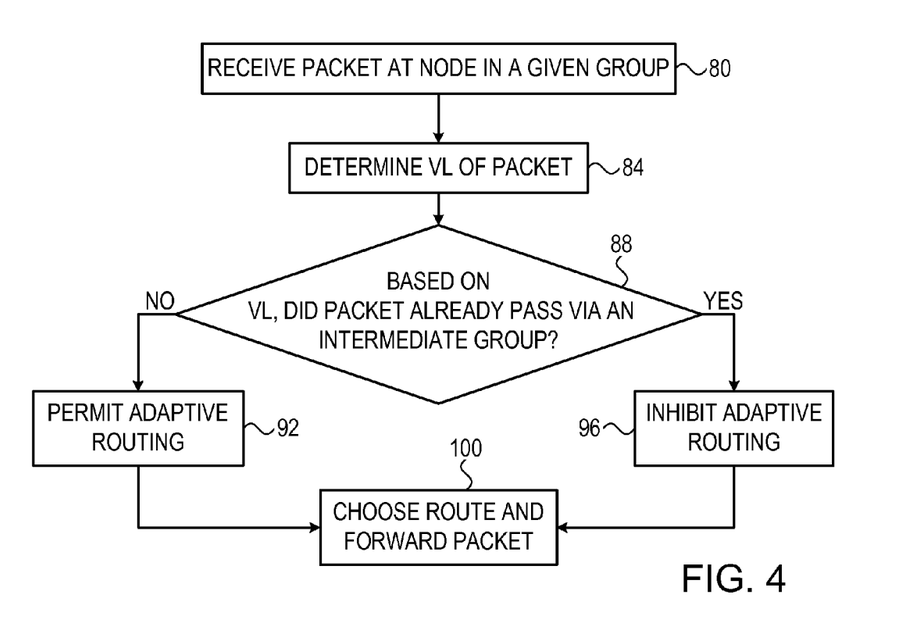
FIG. 4 is a flow chart that schematically illustrates a method for progressive Adaptive Routing (AR) in the network of FIG. 1, in accordance with an embodiment of the present invention.

FIG. 4 is a flow chart that schematically illustrates a method for progressive Adaptive Routing (AR) in the network of FIG. 1, in accordance with an embodiment of the present invention. The method begins with a node 24 receiving a packet, at a reception step 80. The node determines the VL with which the packet is associated, at a VL identification step 84.

At a checking step 88, the node checks, based on the packet VL, whether or not the packet already passed through an intermediate group before arriving at the node. As explained above, if the VL is still the originally-assigned VL, the node concludes that the packet did not go through an intermediate group. If the packet VL has been modified, the node concludes that the packet already traversed an intermediate group.

If the packet did not go through an intermediate group yet, the node permits applying AR to the packet, at an AR activation step 92. If the packet already passed through an intermediate group, the node prohibits applying AR to the packet, at an AR deactivation step 96.

At a selective AR step, the node chooses a route for the packet and routes the packet to the chosen route. If AR is permitted (at step 92), the node is free to choose either a direct path to the destination group, or an indirect route that goes through an intermediate group. If AR is disabled (at step 96), the node has to choose a direct route to the destination group.

The method of FIG. 4 gives the nodes maximum flexibility in applying AR, while at the same time ensuring that no more than a single intermediate group is traversed.

The above-described AR scheme can be implemented in nodes 24 in various ways. In an example embodiment, each node 24 holds three forwarding tables denoted pLFT0, pLFT1, pLFT2. For a given packet, the node chooses the appropriate pLFT based on the port (or equivalently the receive queue—RQ) via which the packet arrived, and on the VL value of the packet. The node then accesses the chosen pLFT, which specifies the AR options (if any) for onward routing of the packet.

Figure 5:
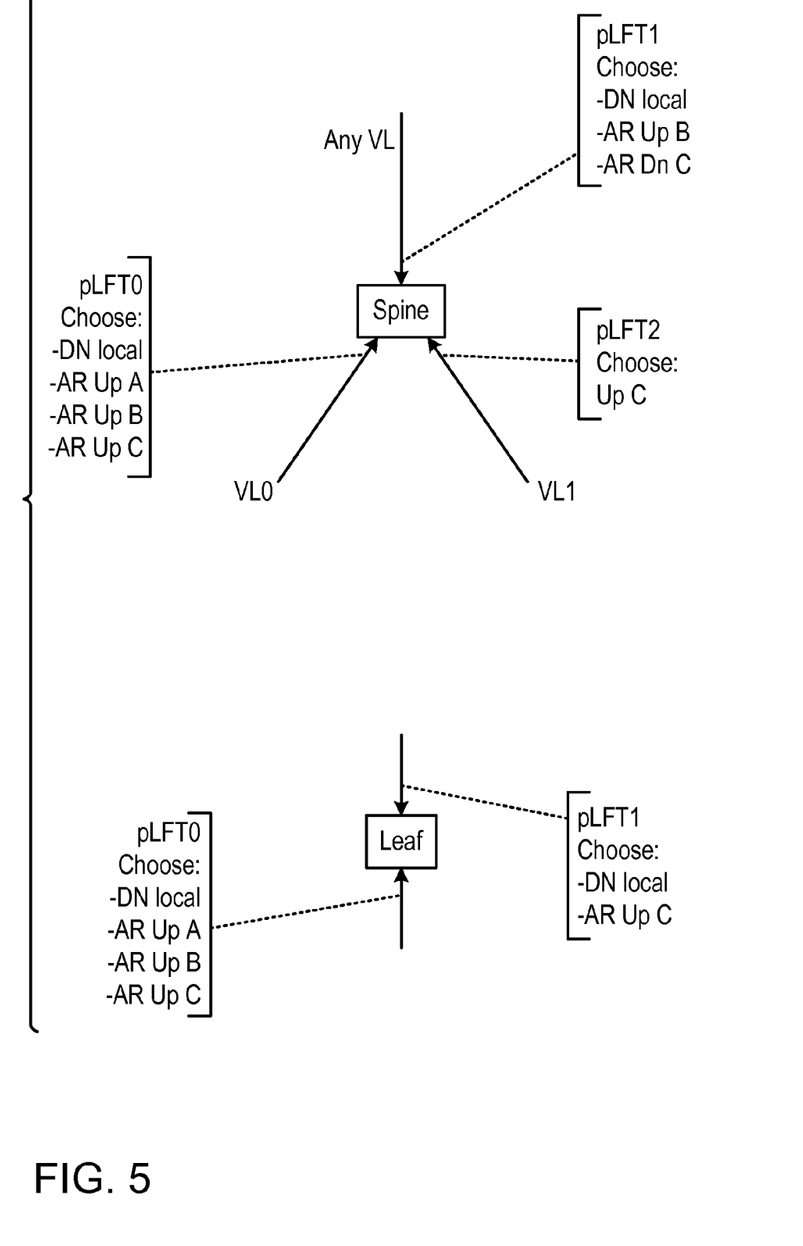
FIG. 5 is a diagram that schematically illustrates forwarding tables used in a progressive AR process, in accordance with an embodiment of the present invention.

FIG. 5 is a diagram that schematically illustrates forwarding tables used in a progressive AR process, in accordance with an embodiment of the present invention. The figure uses the following notation:

"DN local"—Forward the packet on a local link 36 inside the group, in the direction of hosts 38.

"AR Up A"—Forward the packet to the global network using adaptive routing, on a type-A path, i.e., directly to the destination group.

"AR Up B"—Forward the packet to the global network using adaptive routing, on a type-B path, i.e., via an intermediate group in which a spine node serves as a reflecting node.

"AR Up C"—Forward the packet to the global network using adaptive routing, on a type-C path, i.e., via an intermediate group in which a leaf node serves as a reflecting node.

When two or more of the above routing options are valid, they are listed in descending order of priority.

Consider, for example, the bottom of the figure, which specifies the routing scheme in a leaf node. A packet entering a leaf node from "below" (i.e., from a local host 38) is routed using pLFT0. If the packet is addressed to a local host served by the leaf node, the node forwards it locally to that host. Otherwise, the node forwards the packet to the global network using adaptive routing, using either a type-A, type-B or type-C path, in descending order of priority. All routing options are valid because, since the packet arrived from a local host, it did not traverse any intermediate group yet.

A packet entering the leaf node from "above" (i.e., from a spine node) is routed using pLFT1. In this scenario there are two options: If the packet is addressed to a local host 38, it is forwarded on a local link. Otherwise, the node concludes that the packet is in the process of being forwarded over a type-C path (in which the present leaf node is the reflecting node). As such, the leaf node forwards the packet to the global network to continue the type-C path. No "AR Up A" or "AR Up B" options are available in this case.

The top of the figure specifies the routing of a packet by a spine node. For a spine node, the routing decision sometimes depends on the packet VL, as well. A packet entering the spine node from "above" (from the global network) is routed using pLFT1, regardless of VL. If the packet is addressed to a local host 38 in the group, the node routes it over the appropriate local link. Otherwise, the node forwards the packet back to the global network using adaptive routing, using either a type-B or type-C path, in descending order of priority.

A packet entering the spine node from "below" (on a local link 36 from a leaf node) is routed depending on its VL value. If VL=0 (indicating the packet did not traverse an intermediate group yet), the node routes the packet using pLFT0. All routing options are valid (local routing in the group, or routing to the global network using either a type-A, type-B or type-C path, in descending order of priority).

If VL=1 (indicating the packet already traversed an intermediate group), the spine node routes the packet using pLFT2. In this case, the spine node concludes that the packet is in the process of being forwarded over a type-C path. The only choice in this case is onward routing to the global network using a type-C path.

In some embodiments, it is possible to combine pLFT0 and pLFT2 in a single forwarding table, in order to save memory. When accessing the combined table, the node is permitted to access the entire table if VL=0, and only the "Up C" option if VL=1.

The forwarding table implementation of FIG. 5 is shown purely by way of example. Any other suitable implementation can be used in alternative embodiments.

The above technique is not limited to AR, and can be used with any other suitable routing scheme in which a given node is permitted to choose a route from among a set of possible routes. One non-limiting example of such a routing scheme is Equal-Cost Multi-Path (ECMP) routing, in which the traffic is typically distributed to multiple ports by computing a hash function over the packet source and destination addresses. In an example embodiment, a node along the routing path decides whether (and to what extent) to allow ECMP based on the VL value of the packet. In one embodiment, if VL=0, then the node permits ECMP among paths of types A, B and C. If VL=1, the node permits ECMP among paths of type C only. Other possible examples are random or weighted-random forwarding over a list of allowed ports.

Routing Using Inter-Node AR Notifications

In some embodiments, nodes 24 of network 20 carry out adaptive routing using inter-node AR notifications. In these embodiments, a node 24 along a routing path may detect an event that compromises its ability to forward the packets over the next link (e.g., link-fault, congestion or head-of-line time-out). This event is referred to herein as an AR event. Upon detecting an AR event, the detecting node generates a packet referred to as an AR Notification (ARN), and sends the ARN backwards along the path. The ARN typically indicates the AR event to the preceding nodes along the path, and requests the preceding nodes to modify the route so as not to traverse the detecting node.

When a preceding node receives the ARN, it typically checks whether it is in a position to modify the path, and whether the traffic in question is permitted to undergo AR. If so, the node consumes the ARN and modifies the path. Otherwise, the switch forwards the ARN to the previous node along the route. Further aspects of routing using ARN are addressed in U.S. patent application Ser. No. 13/754,921, filed Jan. 31, 2013, entitled "Adaptive Routing Using Inter-Switch Notifications," which is assigned to the assignee of the present patent application and whose disclosure is incorporated herein by reference.

Figure 6:
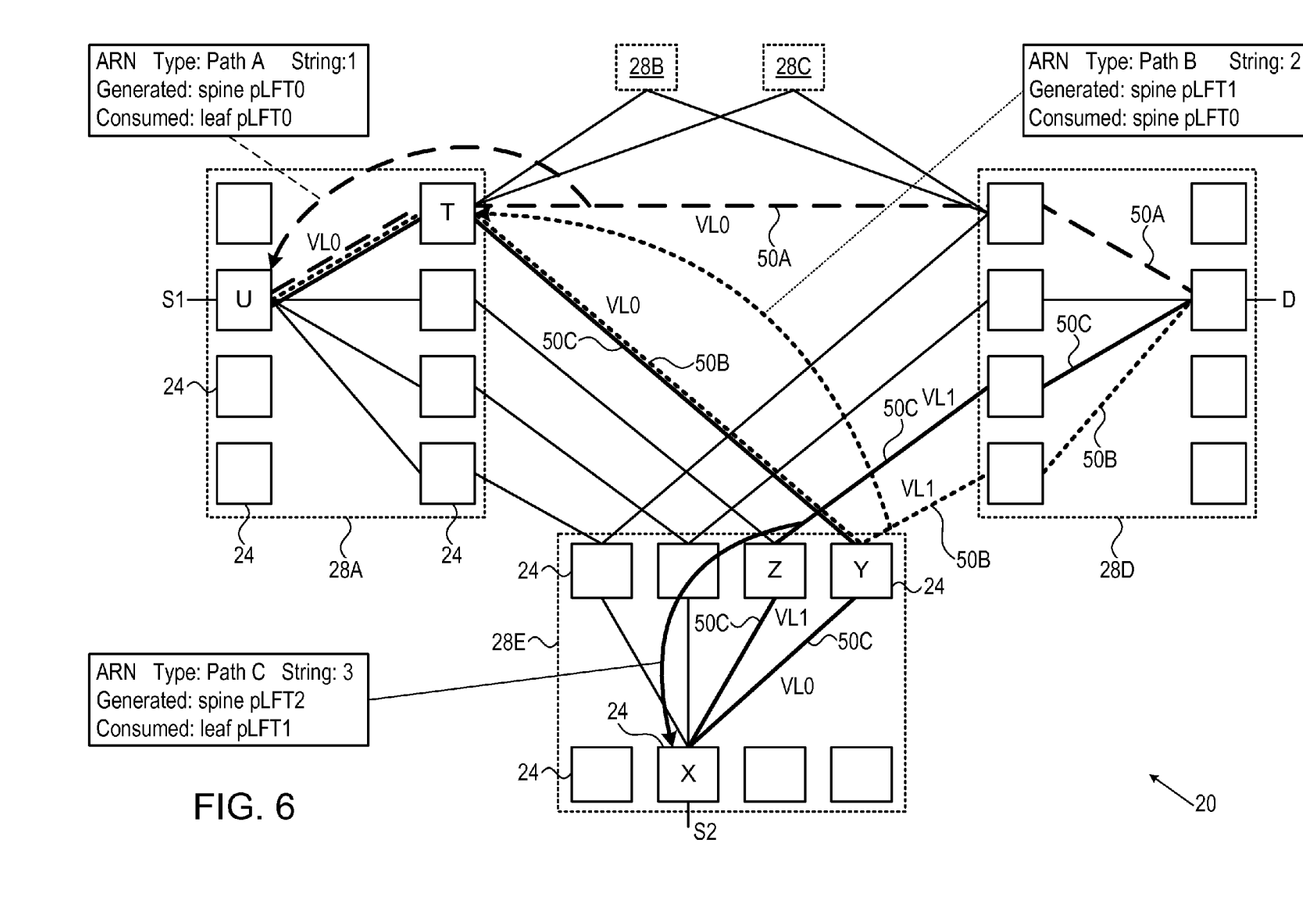
FIGS. 6 and 7 are diagrams showing routing in the network of FIG. 1 using inter-node notifications, in accordance with embodiments of the present invention.

FIG. 6 is a diagram showing routing in network 20 using ARN, in accordance with an embodiment of the present invention. The figure shows three scenarios, corresponding to type-A, type-B and type-C paths. Consider path 50A (a type-A path that does not traverse an intermediate group). In this example, a spine node denoted T in group 28A discovers that the next hop on the path (the global link to group 28D) is congested or otherwise unusable. In response to detecting this AR event, node T sends an ARN packet to the preceding node on path 50A (in this case a leaf node in group 28A).

The ARN packet indicates the type of path, the type of node and pLFT of the detecting node, the type and pLFT of the consuming node, and a string value "1". This ARN indicates to the leaf node that there may exist other type-A paths leading to the same desired destination group (group 28D) via other spine nodes. In response, the leaf node may attempt routing the packet via another spine node in group 28A.

As another example, consider path 50B (a type-B path). In this example, spine node Y in group 28E (serving as an intermediate group) discovers that the next hop (the global link to group 28D) is unusable. Node Y thus sends an ARN packet to leaf node T, which is the preceding node on path 50B. This ARN (with string value "2") indicates to leaf node T that there may exist other type-B paths leading to group 28D via other spine nodes (possibly in other intermediate groups). In response, the leaf node may attempt routing the packet via another spine node.

As yet another example, consider path 50C (a type-C path). In this scenario, a spine node Z in group 28E (serving as an intermediate group) discovers that the next hop (the global link to group 28D) is unusable. Node Z sends an ARN packet to leaf node X in the same group, which is the preceding node on path 50C. This ARN (with string value "3") indicates to leaf node T that there may exist other type-C paths leading to group 28D via other spine nodes in group 28E. In response, the leaf node may attempt routing the packet via another spine node in the group. As before, AR is performed using type-A, type-B or type-C paths, in descending order of priority.

Figure 7:
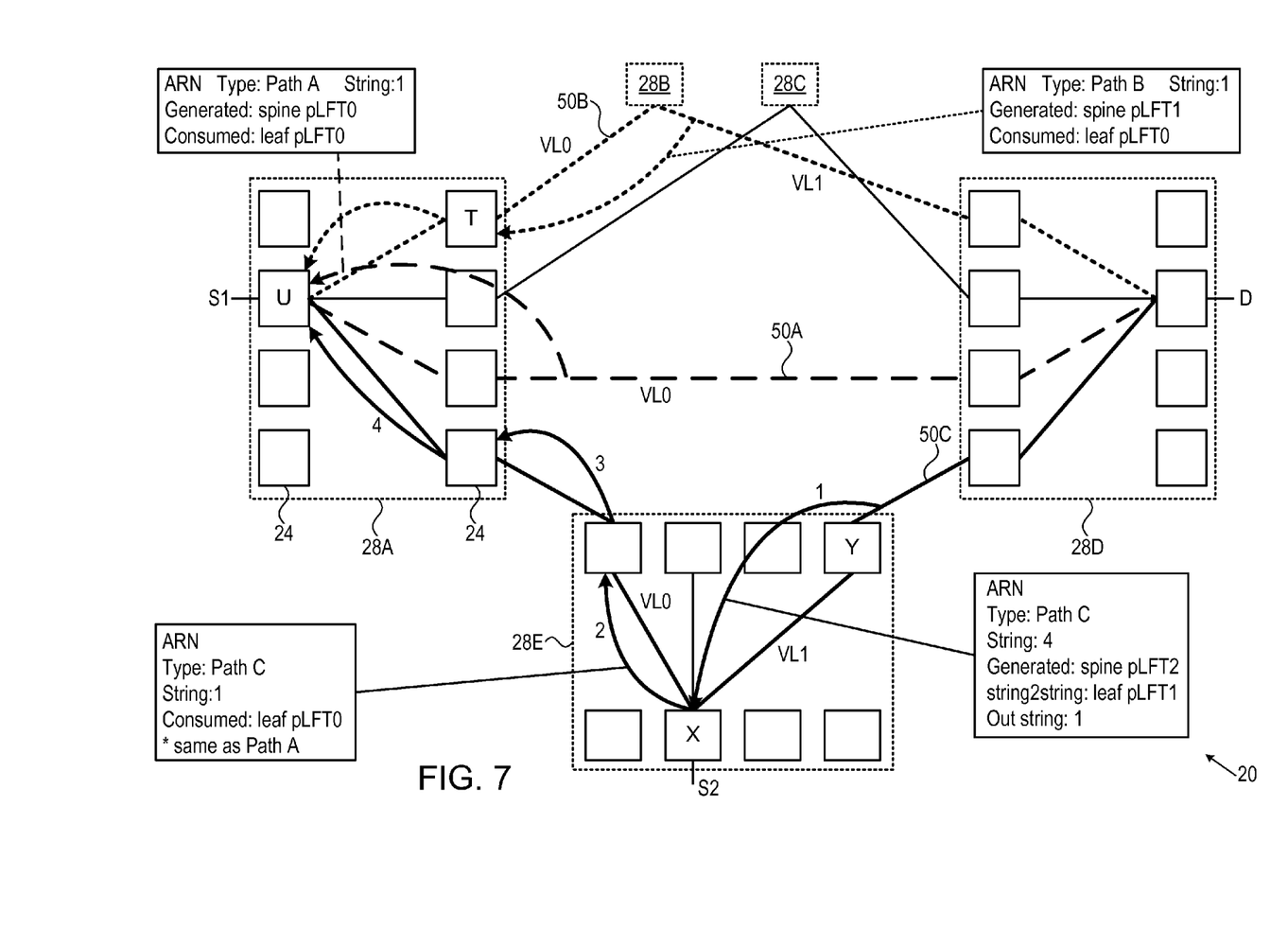

FIG. 7 is a diagram showing routing using ARN, in accordance with an alternative embodiment of the present invention. In this example path 50A performs similarly to the example of FIG. 6. On path 50B, however, the ARN packet (generated by a spine node in group 28B that serves as an intermediate group) is intended to be consumed by the leaf node in group 28A (and not by the spine node in group 28A as in FIG. 6). Therefore, the spine node in group 28A (node T) does not consume the ARN packet but rather forwards it backwards to the leaf node.

On path 50C, the ARN packet is forwarded backwards four times (denoted '1', '2', '3', '4' in the figure) all the way back to the first leaf node on the path. Generally, the string value in the ARN indicates which type of node (leaf or spine) should consume the ARN and using which forwarding table. The embodiment of FIG. 7 also demonstrates a feature in which a node may replace the string value in the ARN before forwarding the ARN to the next node. This replacement mechanism is important, for example, in paths that traverse one leaf node that should pass the ARN onwards, and another leaf node that should consume the ARN.

Consider, for example, path 50C in FIG. 7. On this path, leaf node X (in group 28E) should pass the ARN onwards, and leaf node U (in group 28A) should consume it. In order to make this distinction, node Y generates an ARN with string value '4', indicating to leaf node X that it is the first leaf on this Type-C path and therefore should pass the ARN onwards. This ARN also comprises "string2string" and "out string" attributes, which instruct node X to replace the string value to '1' when passing the ARN onwards. As a result, leaf node U receives an ARN with string value '1', and therefore consumes the ARN as intended.

The scheme of FIG. 6 is suitable, for example, for network configurations in which each spine node is connected to all other groups 28. The scheme of FIG. 7, on the other hand, is suitable, for example, for networks in which each group is connected to any other group using only a single global link. Intermediate network configurations may use either scheme. In an example policy, if a group has three or more global links to each other group (via different spine nodes), the scheme of FIG. 6 is preferable. Otherwise, the scheme of FIG. 7 is preferable.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication network comprising multiple network nodes, each network node comprising multiple hardware-implemented ports and hardware-implemented switch fabric for forwarding packets between the ports,
   wherein the network nodes are arranged in groups such that the network nodes in each group are interconnected using the ports in a bipartite topology in which the network nodes in the group are divided into first and second subsets and all intra-group links internal to the group connect one of the network nodes in the first subset to one of the network nodes in the second subset, and the groups are interconnected using the ports in a mesh topology,
   and wherein the network nodes are configured to convey traffic between source hosts and respective destination hosts by routing the packets among the network nodes using the switch fabrics and the ports on paths that do not traverse any intermediate hosts other than the source and destination hosts.

2. The network according to claim 1, wherein the network nodes are configured to prevent cyclic flow-control deadlocks by modifying a virtual lane value of a packet, which originates in a source group and destined to a destination group, when the packet traverses an intermediate group.

3. The network according to claim 2, wherein the network nodes are configured to prevent the cyclic flow-control deadlocks using no more than two different virtual lane values for any packet.

4. The network according to claim 2, wherein a given network node is configured to modify the virtual lane value of the packet in response to detecting that the packet enters the given network node in an inbound direction from the source group and is to exit the given network node in an outbound direction en-route to the destination group.

5. The network according to claim 2, wherein a given network node is configured to define a set of permitted onward routes for the packet depending on the virtual lane value of the packet, and to choose an onward route for the packet from among the permitted onward routes.

6. The network according to claim 2, wherein a given network node is configured to permit routing of the packet via intermediate groups if the virtual lane value of the packet has not been modified, and to prohibit routing of the packet via intermediate groups if the virtual lane value of the packet has been modified.

7. The network according to claim 1, wherein a given network node is configured to permit onward routing of a received packet, which originates in a source group and destined to a destination group, via an intermediate group only upon verifying that the received packet did not previously traverse any intermediate group.

8. The network according to claim 1, wherein a given network node is configured to define a set of permitted onward routes for a packet depending on a virtual lane value of the packet and on a port of the given network node via which the packet was received.

9. The network according to claim 8, wherein the given network node is configured to store two or more forwarding tables, and to define the set of permitted onward routes by choosing one of the forwarding tables depending on the virtual lane value and the port.

10. The network according to claim 9, wherein the given network node is configured to represent at least two of the forwarding tables using a single table, and to access the single table based on the virtual lane value.

11. The network according to claim 1, wherein the network nodes are configured to select routes for the packets, while giving first priority to direct routes from a source group to a destination group, and second priority to indirect routes that traverse an intermediate group en-route from the source group to the destination group.

12. The network according to claim 1, wherein a network node that lies on a routing path is configured to identify a compromised ability to forward the packets onwards along the routing path, and to send to one or more preceding network nodes along the routing path a notification that requests the preceding network nodes to find an alternative routing path for the packets.

13. The network according to claim 12, wherein the network node is configured to specify in the notification a value that specifies which type of network node is to consume the notification.

14. The network according to claim 13, wherein the routing path comprises first and second preceding network nodes of a same type, and wherein a preceding network node along the routing path is configured to replace the value with a different value, so as to cause one of the first and second preceding network nodes to pass the notification and the other of the first and second preceding network nodes to consume the notification.

15. A method for communication, comprising:
in a communication network that comprises multiple network nodes, each network node comprising multiple hardware-implemented ports and hardware-implemented switch fabric for forwarding packets between the ports, wherein the network nodes are arranged in groups such that the network nodes in each group are interconnected in a bipartite topology in which the network nodes in the group are divided into first and second subsets and all intra-group links internal to the group connect one of the network nodes in the first subset to one of the network nodes in the second subset, and the groups are interconnected in a mesh topology, defining between source hosts and respective destination hosts paths that do not traverse any intermediate hosts other than the source and destination hosts; and
conveying traffic between the source hosts and the respective destination hosts by routing the packets among the network nodes using the hardware-implemented switch fabrics and the hardware-implemented ports on the paths.

16. The method according to claim 15, wherein routing the packets comprises preventing cyclic flow-control deadlocks by modifying a virtual lane value of a packet, which originates in a source group and destined to a destination group, when the packet traverses an intermediate group.

17. The method according to claim 16, wherein preventing the cyclic flow-control deadlocks comprises using no more than two different virtual lane values for any packet.

18. The method according to claim 16, wherein preventing the cyclic flow-control deadlocks comprises, in a given network node, modifying the virtual lane value of the packet in response to detecting that the packet enters the given network node in an inbound direction from the source group and is to exit the given network node in an outbound direction en-route to the destination group.

19. The method according to claim 16, wherein routing the packets comprises, in a given network node, defining a set of permitted onward routes for the packet depending on the virtual lane value of the packet, and choosing an onward route for the packet from among the permitted onward routes.

20. The method according to claim 16, wherein routing the packets comprises, in a given network node, permitting routing of the packet via intermediate groups if the virtual lane value of the packet has not been modified, and prohibiting routing of the packet via intermediate groups if the virtual lane value of the packet has been modified.

21. The method according to claim 15, wherein routing the packets comprises, in a given network node, permitting onward routing of a received packet, which originates in a source group and destined to a destination group, via an intermediate group only upon verifying that the received packet did not previously traverse any intermediate group.

22. The method according to claim 15, wherein routing the packets comprises, in a given network node, defining a set of permitted onward routes for a packet depending on a virtual lane value of the packet and on a port of the given network node via which the packet was received.

23. The method according to claim 22, wherein defining the permitted onward routes comprises storing two or more forwarding tables, and defining the set of permitted onward routes by choosing one of the forwarding tables depending on the virtual lane value and the port.

24. The method according to claim 23, wherein storing the forwarding tables comprises representing at least two of the forwarding tables using a single table, and accessing the single table based on the virtual lane value.

25. The method according to claim 15, wherein routing the packets comprises selecting routes for the packets, while giving first priority to direct routes from a source group to a destination group, and second priority to indirect routes that traverse an intermediate group en-route from the source group to the destination group.

26. The method according to claim 15, wherein routing the packets comprises, in a network node that lies on a routing path, identifying a compromised ability to forward the packets onwards along the routing path, and sending to one or more preceding network nodes along the routing path a notification that requests the preceding network nodes to find an alternative routing path for the packets.

27. The method according to claim 26, wherein sending the notification comprises specifying in the notification a value that specifies which type of network node is to consume the notification.

28. The method according to claim 27, wherein the routing path comprises first and second preceding network nodes of a same type, and wherein specifying the value comprises replacing the value with a different value, so as to cause one of the first and second preceding network nodes to pass the notification and the other of the first and second preceding network nodes to consume the notification.

\* \* \* \* \*